United States Patent
Linzer (10) Patent No.: US 7,852,351 B2
(45) Date of Patent: Dec. 14, 2010

(54) MULTIPLEXED BUTTON DATA SYSTEM

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 980 days.

(21) Appl. No.: 11/122,426

(22) Filed: May 5, 2005

(65) Prior Publication Data

US 2005/0262532 A1  Nov. 24, 2005

Related U.S. Application Data (60) Provisional application No. 60/573,437, filed on May 21, 2004.

(51) Int. Cl.
- G09G 5/00 (2006.01)
- G06F 3/00 (2006.01)
- G06F 3/048 (2006.01)

(52) U.S. Cl. .......... 345/619; 715/762; 715/840

(58) Field of Classification Search .......... 345/619; 715/762, 840
See application file for complete search history.

(56) References Cited

U.S. PATENT DOCUMENTS

| | | | | |
|---|---|---|---|---|
| 5,748,254 A | * | 5/1998 | Harrison et al. | 348/552 |
| 6,377,309 B1 | * | 4/2002 | Ito et al. | 348/554 |
| 6,424,793 B1 | * | 7/2002 | Setogawa et al. | 386/95 |
| 6,828,993 B1 | * | 12/2004 | Hendricks et al. | 715/819 |
| 2002/0054014 A1 | * | 5/2002 | Nishiyama et al. | 345/156 |
| 2004/0221143 A1 | * | 11/2004 | Wise et al. | 712/300 |
| 2005/0138083 A1 | * | 6/2005 | Smith-Semedo et al. | 707/200 |
| 2006/0114809 A1 | * | 6/2006 | Hosokawa | 369/275.1 |
| 2006/0143666 A1 | * | 6/2006 | Okada et al. | 725/89 |
| 2006/0143667 A1 | * | 6/2006 | Kurosawa | 725/89 |
| 2006/0291810 A1 | * | 12/2006 | McCrossan et al. | 386/95 |

* cited by examiner

Primary Examiner—Ulka Chauhan
Assistant Examiner—Jeffrey J Chow
(74) Attorney, Agent, or Firm—Christopher P. Maiorana, PC (57) ABSTRACT

A method for displaying button data streams, comprising the steps of (A) reading two or more input button data streams from a disc, (B) multiplexing the two or more input button data streams to produce a multiplexed button data stream, (C) decoding the multiplexed button data stream into uncompressed button data information, and (D) displaying the uncompressed button data information in a video signal.

15 Claims, 6 Drawing Sheets

FIG. 1
(CONVENTIONAL)

FIG. 2
(CONVENTIONAL)

ONE PIXEL

FIG. 5A 2-3 PIXELS

FIG. 5B 4-7 PIXELS

FIG. 5C 8-15 PIXELS

FIG. 5D 16-31 PIXELS

FIG. 5E 32-63 PIXELS

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| 1 | 0 | 0 | 0 | 0 | \multicolumn{5}{c}{NUM PIXELS} | | | | \multicolumn{5}{c}{PIXEL DATA} | | | | |

320

FIG. 5F 64-480 PIXELS (MULTIPLE OF 16)

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| 1 | 0 | 0 | 0 | 0 | 0 | NUM PIXELS/16 | | | | | PIXEL DATA | | | | |

SAME PIXEL DATA TILL THE END OF LINE

| D0 | D1 | D2 | D3 | D4 | D5 | D6 | D7 | D8 | D9 | D10 | D11 | D12 | D13 | D14 | D15 |
|---|---|---|---|---|---|---|---|---|---|---|---|---|---|---|---|
| 1 | 0 | 0 | 0 | 0 | 0 | 1 | 1 | 1 | 1 | 1 | PIXEL DATA | | | | |

MULTIPLEXED BUTTON DATA SYSTEM

This application claims the benefit of U.S. Provisional Application No. 60/573,437, filed May 21, 2004 and is hereby incorporated by reference in its entirety.

FIELD OF THE INVENTION

The present invention relates to button data in a video system generally and, more particularly, to a method and/or apparatus for implementing a multiplexed button data system.

BACKGROUND OF THE INVENTION

One version of the high definition DVD (HD-DVD) standard has a method for recording button data streams on a DVD. Button data is information that describes the location, shape and color of a button. Buttons can also include navigation information and are often used to represent various options that can be executed. Buttons are typically used in the opening menu of a movie to represent items like "play movie", "director notes", etc. A user can select a button after the user selects a key, such as the "left" key with a remote control (or through a keypad located on the DVD player). The navigation information on a screen can indicate which button was selected with highlighting or some other system.

Figure 1:
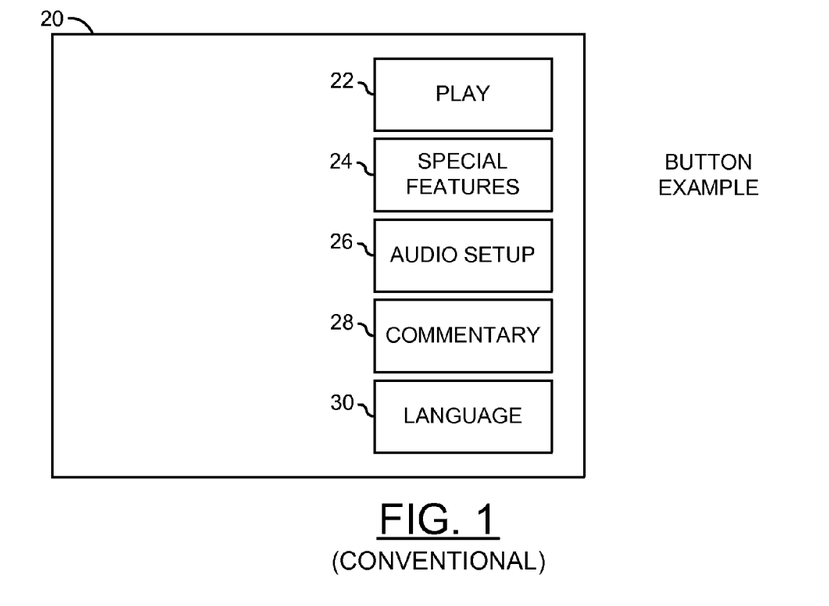
FIG. 1 illustrates a conceptual diagram of a button configuration presented to a user through a visual display.

Referring to FIG. 1, a conceptual diagram illustrating an example of a button configuration presented to a user through a visual display is shown. The button configuration 20 includes a play button 22, a special feature button 24, an audio setup button 26, a commentary button 28 and a language button 30.

Conventional approaches for describing button data involve recording independent compressed bit-maps for each button. In particular, the proposed HD-DVD standard records twenty four independent compressed bit-maps for twenty four buttons. Each compressed bit-map covers an entire output (i.e., 1920×1080).

Figure 2:
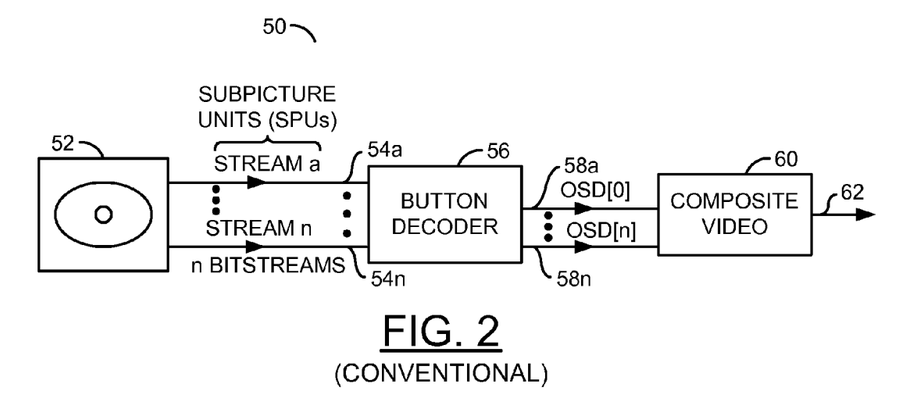
FIG. 2 illustrates a system for recording button data on a DVD.

Referring to FIG. 2, a conventional system for decoding button data streams is shown. The system 50 comprises a disc 52, a button decoder 56, and a composite video circuit 60. The disc 52 stores button data (not shown) for each button. The disc 52 transfers the button data into button data streams 54a-54n. Twenty-four button data streams are transmitted if twenty four buttons are used. The button decoder 56 decodes each of the button data streams 54a-54n. The button decoder 56 transmits on screen display (OSD) messages 60a-60n to the composite video 62 in response to decoding the button data streams 54a-54n. Each OSD message 60a-60n corresponds to a particular button data stream 54a-54n. A user will view the button through the composite video circuit 60, which is typically connected to a monitor.

Conventional approaches are expensive and have difficulty decoding individual button data streams. Conventional approaches composite each button data stream in real time and onto a video when the video is being displayed. Conventional approaches (i) maintain state information for each of the button data streams (ii) establish a buffer for each of the button data streams and (iii) maintain a direct memory access (DMA) channel for each button data stream and (iv) implement a hardware implementation that composites each button data stream in real time.

It would be desirable to provide a method and/or apparatus to reduce the number of button data streams in real time by combining the button data into a multiplexed button data stream.

SUMMARY OF THE INVENTION

The present invention concerns a method for displaying button data streams, comprising the steps of (A) reading two or more input button data streams from a disc, (B) multiplexing the two or more input button data streams to produce a multiplexed button data stream, (C) decoding the multiplexed button data stream into uncompressed button data information, and (D) displaying the uncompressed button data information in a video signal.

The objects, features and advantages of the present invention include providing a method and/or apparatus that may (i) reduce the number of button data streams (ii) provide a low cost solution and/or (iii) eliminate the need to use a hardware implementation that composites each button data stream in real time.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 3:
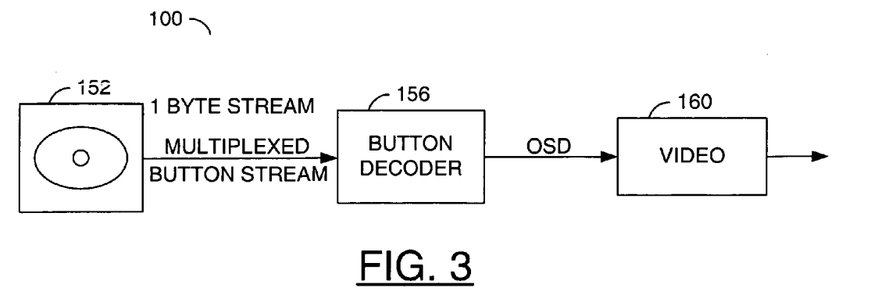
FIG. 3 illustrates a system incorporating the present invention.

Referring to FIG. 3, a system 100 for recording button data on a DVD is shown in accordance with a preferred embodiment of the present invention. The system 100 generally comprises a block 152, a block (or circuit) 156, and a block (or circuit) 160. The block 152 may be implemented as a disc. The disc 152 may be a DVD, a DVD-HD, or other appropriate type of disc. The disc 152 may be implemented as an optical disc or other type of storage disc. The block 152 may include one or more discs. The number of discs in the block 150 may be varied to meet the design criteria of a particular implementation. The circuit 156 may be implemented as a button decoder. The circuit 160 may be implemented as a video generation circuit. In one example, the circuit 160 may be implemented as a special purpose graphics hardware circuit. The disc 152 may store button data (not shown). In general, the button data may include information related to the location, shape and color of one or more buttons. A signal (e.g., multiplexed button data stream (MBDS)) may transfer the button data stored on the disc 152. The signal MBDS may be presented to the decoder 156. The decoder 156 may decode the multiplexed button data stream. A signal (e.g., OSD) may transfer the decoded button data to the video generation circuit 142. The signal OSD may be implemented as an on screen display signal.

Figure 4:
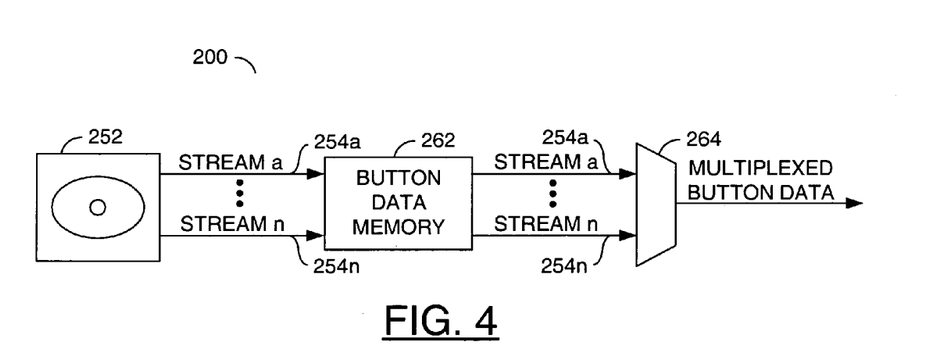
FIG. 4 illustrates an another embodiment of the system in FIG. 3.
Figure 5A:
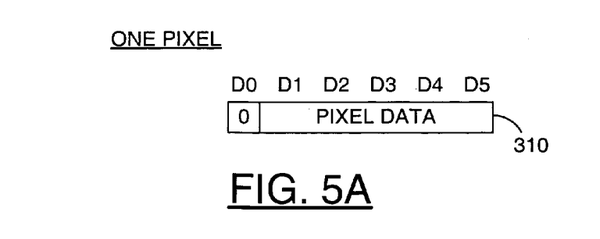
FIGS. 5A-5H illustrates an embodiment of an implementation of a button table.
Figure 5B:
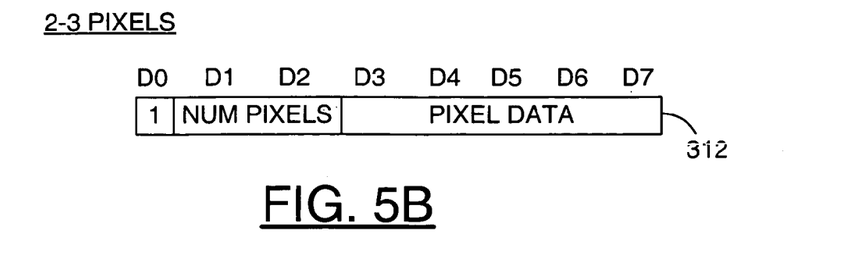
Figure 5C:
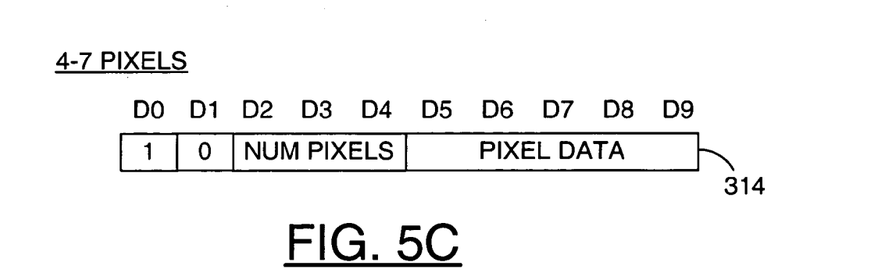
Figure 5D:
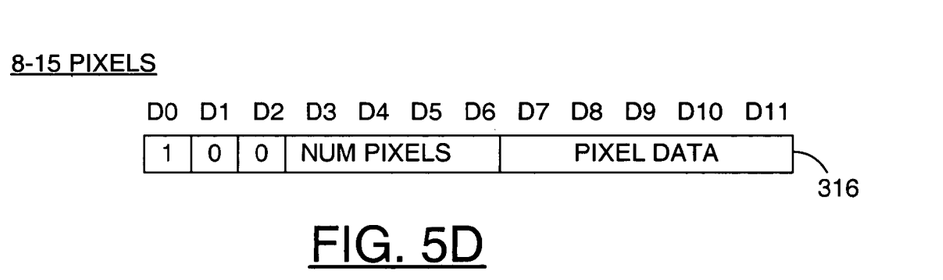
Figure 5E:
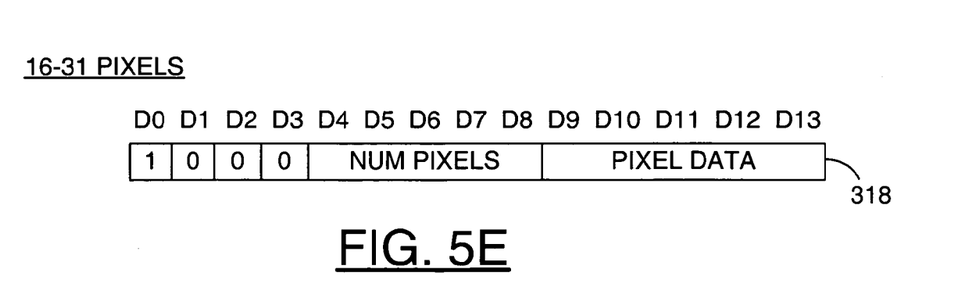
Figure 5F:
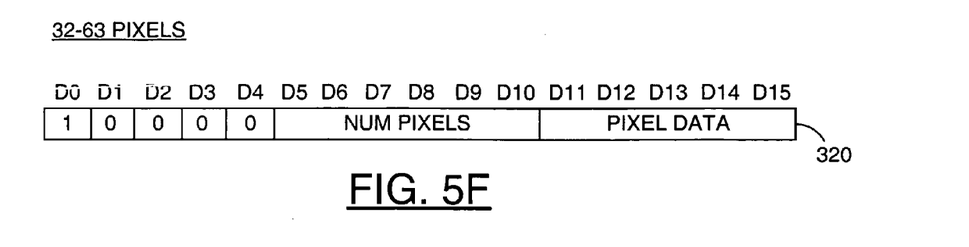
Figure 5G:
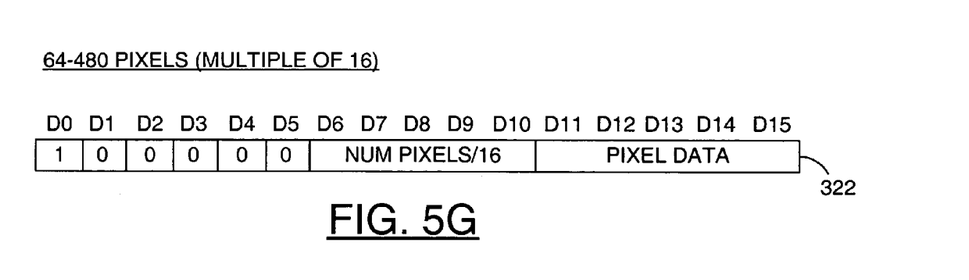
Figure 5H:
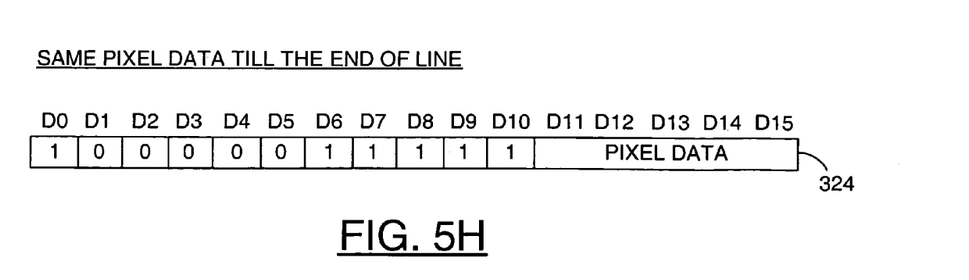

Referring to FIG. 4, a system 200 illustrating an alternative embodiment of the present invention is shown. The system 200 generally comprises a block 252, a block (or circuit) 262, and a block (or circuit) 264. The circuit 252 may be implemented as a disc 252. The disc 252 may be a DVD, a DVD-HD, or other type of disc. The disc 252 may be implemented as an optical disc or other type of storage disc. The circuit 262 may be implemented as a button data memory. The circuit 264 may be implemented as a multiplexer, such as a button multiplexer. The disc 252 may store button data (not shown). The disc 252 may transfer the button data into the button data streams 254a-254n. In one example, twenty-four button data streams 254a-254n may be transmitted if twenty four buttons are used. However, the particular number of button data streams 254a-254n may be varied to meet the design criteria of a particular implementation. The button data streams 254a-254n may be stored in the button data memory 262. For example, the button data memory 262 may provide storage for a number of button data streams generated by other discs. The multiplexer 264 may receive the button data streams 254a-254n. The button multiplexer 264 may generate a signal (e.g., MBDS) that represents a multiplexed button data stream.

In one example, the system 100 may be implemented in accordance with the existing HD-DVD specification to obtain a single multiplexed button data stream. The current HD-DVD specification uses up to twenty four button pattern data tables (BTNPDTs) to represent the location of each button. The system 100 may use the button pattern data tables to represent the location of each of the plurality of buttons. The button data represented in the data tables may be similar to the information included in the multiplexed button data stream MBDS. The number of buttons used to generate the button data and later integrated with the multiplexed button data stream MBDS may be varied to meet the design criteria of a particular implementation.

The HD-DVD specification may allow buttons to overlap. If the buttons overlap, a description of the overlapping buttons detailing the arrangement of the overlapped buttons is normally presented prior to establishing the data tables. The description of overlapping buttons will aid in determining the stacking order of the buttons. If the buttons do not overlap, the format of the signal MBDS may be modified to allow the system 100 to be implemented with simpler and cheaper hardware.

The implementation of the signal MBDS may be efficient in terms of space used. For example, the twenty four button data tables used in the existing HD-DVD specification may be represented within the signal MBDS. Depending on the actual patterns of the buttons, the size of the signal MBDS may be larger or smaller than the size of the twenty four individual button data tables currently used in the HD-DVD specification.

The implementation of the signal MBDS into the system 100 may be implemented through multiple embodiments. In one embodiment, the same format used in the HD-DVD specification may be used by replacing a one-bit pixel data with a five-bit pixel data.

If the five-bit pixel data is equal to 0, then there is no button data as shown in the following TABLE 1:

TABLE 1

| Pixel Data | Button |
|---|---|
| 0 | No button data for these pixels |
| N, 1 <= N <= 24 | Button N |
| >=25 | Reserved |

If the five-bit pixel data is equal to a value N, which may be between one and twenty four for a compliant system, then the corresponding button is equal to N. If the five-bit pixel data is greater than or equal to twenty-five, then the corresponding button may be reserved.

In another embodiment, the pixel data in TABLE 1 may be defined by the equation ceiling (log 2($BTN\_Ns+1$), where $BTN\_Ns$ is defined as the maximum number of buttons used. For example, if $BTN\_Ns$ is less than 15, then the number of bits used will be less than 5, resulting in less memory and bandwidth being used.

Referring to FIGS. 5A-H, another embodiment of implementing the signal MBDS is shown. One or more codewords 300 may be used to indicate the number of pixels and corresponding pixel data. The number of pixels may indicate the number of consecutive pixels from a particular button. In one example, a code word 310 may be implemented as a single pixel having five bits of pixel data. In another example, a code word 312 may be implemented to include between two and three pixels with five bits of pixel data. In another example, a code word 314 may be implemented to include between four and seven pixels with five bits of pixel data. In another example, a code word 316 may be implemented to include between eight and fifteen pixels with five bits of pixel data. In another example, a code word 318 may be implemented to include between sixteen and thirty-one pixels with five bits of pixel data. In another example, a code word 320 may be implemented to include between thirty-two and sixty-three pixels with five bits of pixel data. In another example, a codeword 322 may be implemented to include between sixty four and four hundred and eighty pixels that are multiples of sixteen with five bits of pixel data. In another example, a codeword 324 may be implemented to include a maximum number of pixels (e.g., pixel data until the end of the line) with five bits of data. The multiplexed stream describes what happens on each pixel (e.g., is there button data and if so which button). The stream can be viewed as a series of commands, where the first codeword (command) indicates what to do starting on the upper-left pixel. For example, if an image is 1920Hx1080V, the following commands may be used:

a. Code word B, 2 pixels, PIXEL DATA=0→pixels 0-1 on line 0 have no button data.
b. Code word F, 50 pixels, PIXEL DATA=7→pixels 2-51 on line 0 are from button 7.
c. Code word H, PIXEL DATA=9→pixels 52-1919 on line 0 are from button 9.
d. Code word D, 10 pixels, PIXEL DATA=12→pixels 0-9 on line 1 are from button 12.

The size of the codewords 300 may be limited to 16 bits. The codeword 320 specifies the number of pixels as a multiple of 16, which may result in an increase in efficiency. Such an embodiment may be modified to define the size of the pixel data as ceiling (log 2 ($BTN\_Ns+1$)). The pixel data may correspond to the button as shown in TABLE 1.

By implementing the signal MBDS, an efficient method for storing application button data on a memory may be achieved (e.g., in a DVD player, a DVD recorder, and a video game player). A particular device that may implement an on screen display that may store application button data on such a memory device. Normally, the button data is uncompressed. By implementing the multiplexed button data signal MBDS, space is conserved because the signal MBDS is normally compressed. Such compression may result in a cost savings because the complex playback of the currently proposed HD-DVD method may not be needed. The signal MBDS may be implemented in a video decoder that includes the hardware to decode and display a multiplexed button stream.

In another embodiment, reducing the twenty four BTNP-DTs may be accomplished by trans-formatting GRU information into a component which may be simple for hardware and software to composite. GRU is the HD-DVD term for the "graphics unit"; (e.g., the data that comprises the button information). In one embodiment a disc may be encoded (or recorded) having a representation that includes a multiplexed data stream. Such an implementation (e.g., FIG. 3) may allow an easier implementation than the proposed standard, but may not be compliant with current standards. In another embodiment (e.g., FIG. 4) the button streams are not multiplexed on the disc, but instead within a player containing the memory 262 and the multiplexer 264. Such an implementation would normally be compliant with current standards. In order to trans-format in software, the maximum rate of the GRU stream may need to be determined. In general, the maximum rate of the GRU stream may be 30.24 mb/sec. By maintaining the maximum rate of the GRU stream to less than or equal to 30.24 mb/sec, the trans-format process may be implemented in software. An assessment may be made to determine the number of millions of instructions per second (MIPS).

For a low rate GRU stream, the multiplexed GRU segments may update at a rate equal to the frame rate. The format for trans-formatting may be small. The format for the trans-formatting may not be a fixed number of bits/pixel. If the format is fixed at a number of bits/pixel, the trans-formatting in software will generate 1920*1080*fixed number of bits/pixel every frame time. With the format fixed at the number of bits/pixel, the trans-formatting in software may not be possible due to the expense associated with the bandwidth and dynamic random access memory (DRAM). The new format (Multiplexed GRU) is designed to be not much more space than the old format (separate streams for each button). Therefore, the limit on the size of the old format means that the Multiplexed GRU will not be too large and will normally not consume undue amounts of DRAM bandwidth and processing resources.

While consuming any number of multiplexed GRU segments, a new format may be quickly generated. For a pixel with Graphic Data (e.g., CLUT8), at least 8 bits may be consumed and the pixels may be trans-formatted slowly. When there is no Graphic Data, an output may be generated quickly. The output may be generated quickly by avoiding the need to check twenty four streams for every pixel.

A format specification defines a button number (e.g., Bnum) for each pixel, with a "0" used to indicate that the pixel has no button information. Each pixel with a non-zero Bnum also has a CLUT8 value specified. The hardware will select the appropriate CLUT based on Bnum. The new format is a byte stream that may include a Control byte and a CLUT8 byte. The format details are shown in the following tables:

TABLE 2

| LSI GRU segment | | |
|---|---|---|
| Control | | u8 |
| if( Bnum ) | { | |
| | For( k = 0; k < Count; k++) { | |
| | CLUT8 | u8 |
| | } | |
| } | | |

Each LSI GRU segment specifies the Bnum and CLUT8 value for Count pixels. Count and Bnum are embedded in the Control byte. The syntax for the control byte is shown in the following TABLE 3:

TABLE 3

| Control byte | |
|---|---|
| New | u1 |
| If( New) { | |
| count_code | u2 |
| Bnum | u5 |
| } else { | |
| count_code | u7 |
| } | |

If New is set (equal to 1), Bnum is specified explicitly in the control word as shown above. Otherwise New is clear (equal to 0) and Bnum is unchanged from the previous LSI GRU segment. The values for Bnum between 25 and 31 are reserved. Count is computed from count_code as shown in the following TABLE 4:

TABLE 4

| Count (count_code) |
|---|
| If( count_code <= 30) |
| Count = count_code + 1 |
| else |
| Count = 32* (count_code − 30) |

In a conventional stream, there are num_of_bts individual button streams (IBS), where num_of_bts <=24. Each IBS specifies, for each pixel in the image, if there is button data for that button. Each IBS represents a "1" (there is button data or "0" (there is no button data) for that button number. There is also a CLUT stream representing 1 byte of CLUT data for each pixel that has button data.

In the stream of the present invention, there is one Multiplexed GRU (MGRU) stream. The MGRU stream specifies the button number for each pixel in the image (button number 0→no button) and 1 byte of CLUT for each pixel with button data. In the case when the buttons cannot overlap, the num_of_bts IBSs represent the same information as the MGRU stream.

Figure 6:
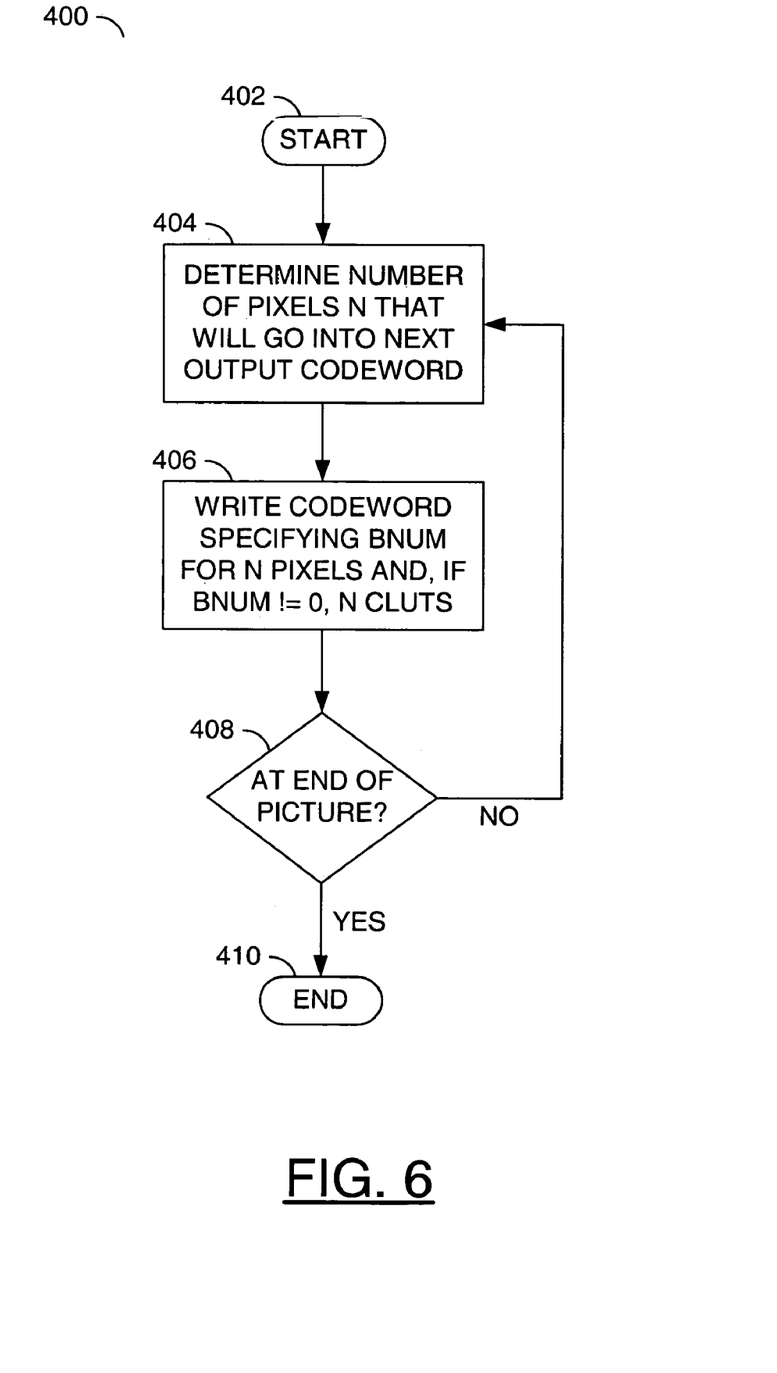
FIG. 6 illustrates a flow diagram of another preferred embodiment of the present invention.

The button number BNUM and value CLUT parsing all num_of_bts IBSs simultaneously. FIG. 6 shows a process 400 for generating an MGRU while parsing all num_of_bts IBSs simultaneously. Details of how to determine "button number of next pixel" and "CLUT for next pixel" are not shown, since conventional processes may be used. The process 400 generally comprises a start state 402, a state (or step) 404, a state (or step) 406, a decision state. (or step) 408, and an end state 410. After the start state 402, the process 400 moves to the state 404. The state 404 determines the number of pixels (e.g., N) that will go into the next output code word. Next, the method moves to the state 406. The state 406 writes a code word specified BNUM for N pixels and, if BNUM is equal to 0, N CLUTS are implemented. Next, the method 400 moves to the state 408. The state 408 determines if the method 400 is at the end of the picture. If so, the method 400 moves to the end state 410. If not, the method 400 moves back to the state 404.

Figure 7:
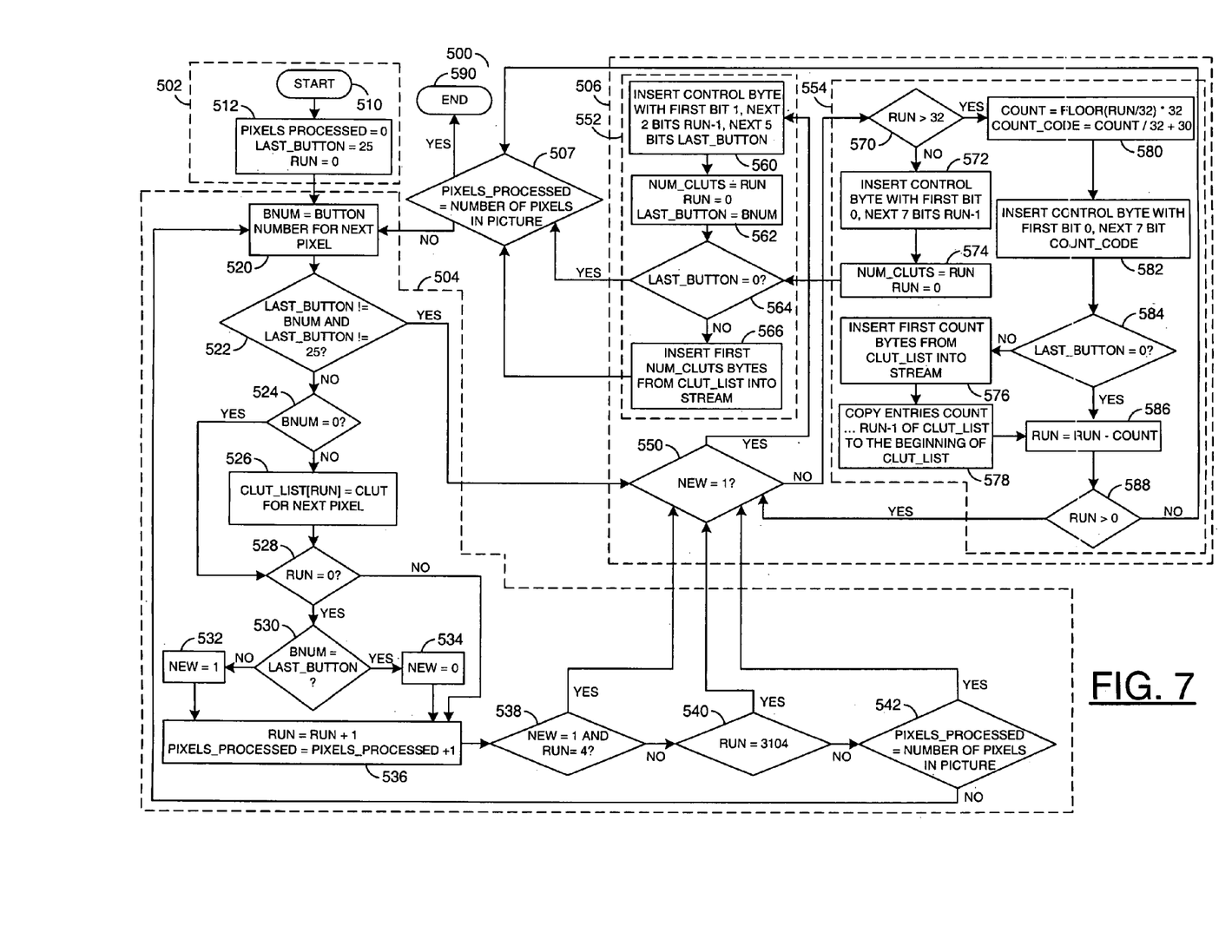
FIG. 7 illustrates a more detailed diagram illustrating the operation of the present invention.

Referring to FIG. 7, a method 500 is shown implementing details of the present invention. The method 500 generally comprises a portion 502, a portion 504, a portion 506, and a decision state 507. The portion 502 generally initializes the method 500. The portion 502 generally comprises a state 510 and a state 512. The state 510 may be a start state. The state 512 may be an initialization state. The portion 504 generally comprises a state 520, a decision state 522, a decision state 524, a state 526, a decision state 528, a decision state 530, a state 532, a state 534, a state 536, a decision state 538, a decision state 540, and a decision state 542. The portion 506 generally comprises a decision state 550, a YES portion 552, and a NO portion 554. The portion 552 generally comprises a state 560, a state 562, a decision state 564 and a state 566. The section 554 generally comprises a decision state 570, a state 572, a state 574, a state 576, a state 578, a state 580, a state 582, a decision state 584, a state 586 and a decision state 588.

The state 520 generally initializes the signal BNUM. The decision state 522 determines if the signal LAST_BUTTON and the signal BNUM are equal to 25. If so, the method 500 moves to the decision state 550. If not, the method 500 moves to the decision state 524. The decision state 524 determines if the signal BNUM is equal to 0. If so, the method 500 moves to the decision state 528. If not, the method 500 moves to the state 526. The state 526 sets the signals CLUT_LIST[RUN] equal to CLUT for the next pixel. Next, the method 500 moves to the decision state 528, which determines whether the signal RUN is equal to 0. If so, the method 500 moves to the decision state 530. If not, the method 500 moves to the state 536. The decision state 530 determines whether the signal BNUM is equal to the signal LAST_BUTTON. If so, the method 500 moves to the state 534 which sets the signal NEW equal to 0. If not, the method 500 moves to the state 532 which sets the signal NEW equal to 1. The state 532 and the state 534 move to the state 536. The state 536 sets the signal RUN equal to RUN+1 and sets the signal PIXELS_PROCESSED equal to PIXELS_PROCESSED+1. Next, the method 500 moves to the decision state 538 and determines whether the signal NEW is equal to 1 and the signal RUN is equal to 4. If so, the method moves to the decision state 550. If not, the method moves to the decision state 540. The decision state 540 determines whether the value RUN is equal to 3104. If so, the method 500 moves to the decision state 550. If not, the method 500 moves to the decision state 542. The state 542 determines whether the signal PIXELS_PROCESSED is equal to the number of pixels in picture. If not, the method 500 moves back to the state 520. If so, the method 500 moves to the decision state 550.

The decision state 550 determines whether the signal NEW is equal to 1. If so, the method 500 moves to the state 560. If not, the method 500 moves to the decision state 570. The state 560 inserts a control byte with a first bit equal to 1, the next two bits equal to RUN −1 and the next five bits equal to LAST_BUTTON. Next, the state 562 sets the signal NUM_CLUTS equal to RUN, the signal RUN equal to 0 and a signal LAST_BUTTON equal to BNUM. Next, the decision state 564 determines whether the signal LAST_BUTTON is equal to 0. If so, the method 500 moves to the decision state 507. If not, the method 500 moves to the state 566. The state 566 inserts a first NUM_CLUTS byte from the signal CLUT_LIST into the data stream and then the method 500 moves to the decision state 507.

The decision state 570 determines whether the signal RUN is greater than 32. If so, the method 500 moves to the state 580. If not, the method 500 moves to the state 572. The state 572 inserts a control byte with a first bit equal to 0, and the next seven bits equal to RUN −1. Next, the method 500 moves to the state 574 which sets the signal NUM_CLUTS equal to RUN, and the signal RUN equal to 0. The method 500 then moves to the decision state 564. In the state 580, the method 500 sets the count equal to FLOOR(RUN/32)*32 and a signal COUT_CODE equal to COUNT/32+30. Next, the state 582 inserts a control byte with a first bit of 0, in the next seven bits of COUNT_CODE. Next, the decision state 584 determines if the signal LAST_BUTTON is equal to 0. If so, the method 500 moves to the state 586. If not, the method 500 moves to the state 576. The state 576 inserts a first count byte from the signal CLUT_LIST into the data stream. Next, the state 578 copies and recounts of the signal RUN −1 of the signal CLUT_LIST to the beginning of the signal CLUT_LIST and the method 500 moves to the state 586. The state 586 sets the signal RUN equal to RUN-COUNT. Next, the decision state 588 determines whether the signal RUN is greater than 0. If so, the method moves to the decision state 550. If not, the method 500 moves to the decision state 507. The decision state 507 determines if the pixels processed are equal to the total number of pixels in the picture. If so, the method 500 ends at a state 590. If not, the method 500 moves back to the state 520.

In another example, the method of trans-formatting may trans-format the Button Pattern Data Table into a format which does not include CLUT8 data and the original Graphic Data. In this example, the software may be execute at a faster rate. However, the hardware may need to deal with two streams instead of one.

The present invention may (i) allow for playback devices to be manufactured cheaper and faster (ii) be compatible with emerging DVD forum standards (iii) be integrated into next generation decoders (iv) allow for implementation of storing application button data on flash (e.g., a DVD player, DVD recorder, and video game player) (v) eliminate the complex playback system of the currently proposed HD-DVD method (vii) allow for an easier play back chip design which may be smaller and therefore less expensive to implement.

Emerging standards for high definition optical discs typically use non-multiplexed button data. The system 200 in FIG. 4 may be used to play such discs. A format that stores multiplexed button data on the disc 152 may be played with the decoder 156 of FIG. 3. The decoder 156 of FIG. 3 may be simpler than the decoder 252 of FIG. 4 since the system 100 does multiplex the button data. A player based on the system 100 of FIG. 3 may not be able to play discs based on the emerging (non-multiplexed) standards without additional circuitry.

The function performed by the flow diagrams of FIGS. 6 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disc including floppy disc, optical disc, CD-ROM, magneto-optical discs, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. A method for displaying button data streams, comprising the steps of:
   (A) reading two or more input button data streams from a disc;
   (B) multiplexing said two or more input button data streams to produce a multiplexed button data stream;
   (C) decoding said multiplexed button data stream into two or more uncompressed button data information streams; and
   (D) displaying said uncompressed button data information streams in a video signal, wherein said video signal is generated without checking each of said two or more data information streams when no graphical information is present on one or more of said data information streams.

2. The method according to claim 1, wherein said uncompressed button data information comprises a plurality of output button data streams.

3. The method according to claim 2, wherein said multiplexed button data stream comprises a data stream that uses 5 bits to represent each button.

4. The method according to claim 3, wherein said multiplexed data stream stores to 24 output data streams.

5. The method according to claim 3, wherein said multiplexed button data stream has enough bits to uniquely represent each of said plurality of output data streams.

6. The method according to claim 2, wherein said multiplexed button data stream comprises a data stream that uses a plurality of bits to represent each button.

7. The method according to claim 1, wherein step (B) is implemented in software.

8. The method according to claim 6, wherein step (D) is implemented in special purpose graphics hardware.

9. An apparatus for displaying button data streams, comprising:
   a reader circuit configured to read two or more input button data streams from a disc;
   a multiplex circuit configured to multiplex said two or more input button data streams to produce a multiplexed button data stream;
   a decoder circuit configured to decode said multiplexed button data stream into two or more uncompressed button data information streams; and
   a display circuit configured to display said uncompressed button data information streams in a video signal, wherein said video signal is generated without checking each of said two or more data information streams when no graphical information is present on one or more of said data information streams.

10. The apparatus according to claim 9, wherein said uncompressed button data information comprises a plurality of output button data streams.

11. The apparatus according to claim 10, wherein said multiplexed button data stream comprises a data stream that uses 5 bits to represent each button.

12. The apparatus according to claim 11, wherein said multiplexed data stream stores to 24 output data streams.

13. The apparatus according to claim 11, wherein said multiplexed button data stream has enough bits to uniquely represent each of said plurality of output data streams.

14. The apparatus according to claim 10, wherein said multiplexed button data stream comprises a data stream that uses a plurality of bits to represent each button.

15. The apparatus according to claim 14, wherein said multiplex circuit is implemented in special purpose graphics hardware.

* * * * *